Feb. 8, 1927.
R. F. RUNGE
1,616,828
SHEET METAL CAGE FOR ROLLER BEARINGS
Filed June 30, 1926
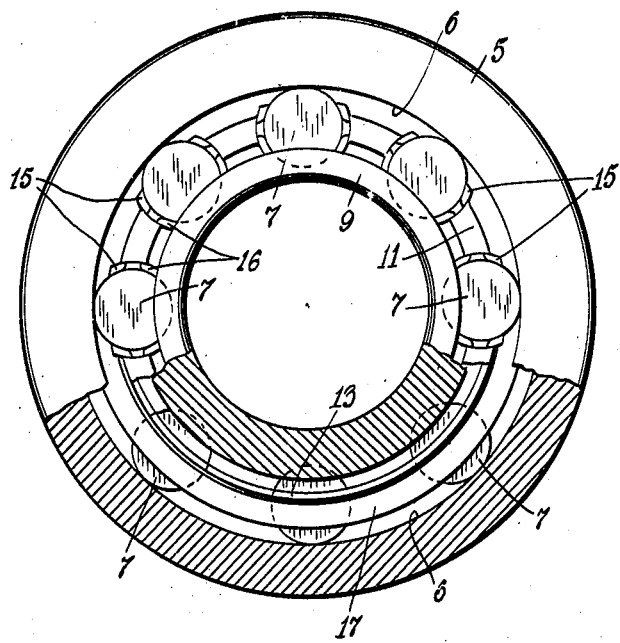
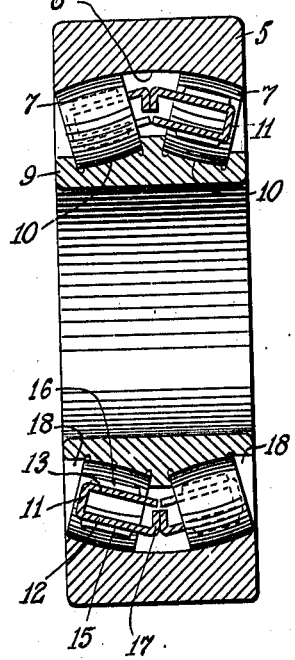
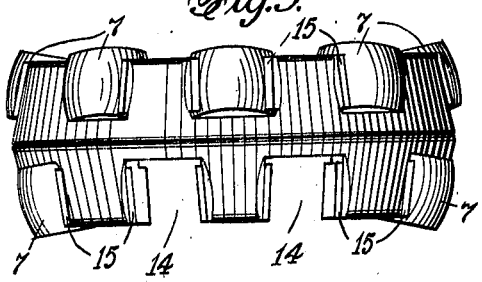
INVENTOR
Robert F. Runge
BY
ATTORNEY Patented Feb. 8, 1927.

1,616,828

UNITED STATES PATENT OFFICE.

ROBERT F. RUNGE, OF FOREST HILLS, NEW YORK, ASSIGNOR TO THE SKAYEF BALL BEARING COMPANY, OF HARTFORD, CONNECTICUT, A CORPORATION OF CONNECTICUT.

SHEET-METAL CAGE FOR ROLLER BEARINGS.

Application filed June 30, 1926. Serial No. 119,577.

This invention relates to sheet metal cages for roller bearings and is particularly useful in that type of bearing wherein the roller is curved in an axial direction, and in which there are two rows of such rollers so arranged on the inner race that the axes of the rollers of each row are disposed on a cone. Many of the features are adapted to other shaped rollers having their outer ends smaller than their inner ends. One of the objects of the invention being to provide separate and independently rotatable cages which are capable of mutual support and guidance one upon the other.

In the drawings accompanying this specification my invention is illustrated applied to a roller bearing of the self-aligning type, in which drawings—

Figure 1 is an end elevation of a roller bearing, the lower part being shown in central cross section.

Fig. 2 is a central longitudinal section of the bearing illustrated in Figure 1, and Fig. 3 is a perspective view of the cage illustrated in Figures 1 and 2, removed from the bearing rings but partly equipped with rollers.

The type of bearing upon which this invention is especially useful is the two row self-aligning roller bearing shown as having an outer ring, 5, provided with an inner spherical surface, 6, constituting the track for two rows of rollers, 7, these rollers being formed with a curvature in an axial direction having suitable radial relation to the radius of the sphere, 6. The bearing is also illustrated as having an inner ring, 9, formed with a pair of race grooves, 10, adapted to receive and guide the rollers in their movement.

The cage for each row of rollers is shown comprising a conical truncated box like structure, the metal having a bend, 11, continuous with both sides, 12 and 13, of the box. At the smaller or outer end of the box there are formed through the bend and the outer edge of the side plates a series of notches, 14, constituting roller sockets or pockets of less depth than the length of the intended roller. The metal at the sides of each notch in both plates is illustrated in the nature of extruded flaps which are straight in a longitudinal direction. It will be seen that the flaps, 15, from the outer plate, 12, project outwardly and that the flaps, 16, from the inner plate, 13, project inwardly.

The smaller or outer end of the box as above explained is formed by the bend, 11. The inner end of the box is formed by an annular flange, 17, bent from one side plate, preferably the outer plate, 12, toward the other plate.

In some instances the rollers will be assembled in the bearing and in position in the cage by being snapped in, which operation in some instances will be facilitated by means of suitable filling notches, 18, formed through the outer lands of the inner ring.

The pair of cages are shown as riding upon the rollers and the inner box ends or flanges, 17—17, in contact, so that each cage supports and guides the other.

Having described my invention I claim and desire to secure by Letters Patent:

1. A cage, for the rollers of a two row roller bearing wherein the rollers are smaller at their outer end and those of each row have their axes disposed on a cone, the cage being formed of sheet metal and comprising; a pair of conical truncated box like structures for the rows of rollers, the metal having a bend continuous with both sides of each box at the smaller end, there being a series of pockets formed through the bend and side plates at this end of a depth less than the length of the intended roller, extruded flaps projecting from the side plates at the sides of each notch for engaging the roller, and an annular flange bent from one side plate toward the other forming the other end of the box, such flanges being so formed as to be normally in contact when assembled in a bearing so that each cage supports and guides the other.

2. A cage, for the rollers of a two row roller bearing wherein the rollers are smaller at their outer ends and those of each row have their axes disposed on a cone, the cage being formed of sheet metal and comprising; a pair of conical truncated box like structures for the rows of rollers, the metal having a bend continuous with both sides of each box at the smaller end, there being a series of pockets formed through the bend and side plates at this end of a depth less than the length of the intended roller, extruded flaps, substantially straight in longitudinal direction, projecting from the side plates at the sides of each notch for engaging the roller, and an annular flange bent from one side plate toward the other forming the other end of the box, such flanges being so formed as to be normally in contact when assembled in a bearing so that each cage supports and guides the other.

Signed at New York, N. Y., this 25th day of June, 1926.

ROBERT F. RUNGE.